: US 9,325,533 B2

(12) United States Patent
Wicker, Jr. et al.

(10) Patent No.: US 9,325,533 B2
(45) Date of Patent: Apr. 26, 2016

(54) SYSTEMS AND METHODS FOR IMPROVED WIRELESS CHANNEL ESTIMATION

(71) Applicant: Ixia, Calabasas, CA (US)

(72) Inventors: David Jennings Wicker, Jr., Hillsboro, OR (US); Thomas Alexander, Mulino, OR (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/520,261

(22) Filed: Oct. 21, 2014

(65) Prior Publication Data
US 2015/0124911 A1    May 7, 2015

Related U.S. Application Data

(60) Provisional application No. 61/900,973, filed on Nov. 6, 2013.

(51) Int. Cl.
| | |
|---|---|
| *H04L 27/06* | (2006.01) |
| *H04B 1/10* | (2006.01) |
| *H04L 25/02* | (2006.01) |
| *H04B 7/04* | (2006.01) |

(52) U.S. Cl.
CPC ........ *H04L 25/0242* (2013.01); *H04L 25/0204* (2013.01); *H04B 7/0413* (2013.01)

(58) Field of Classification Search
CPC .... H04B 7/04; H04B 7/0413; H04L 25/0212; H04L 25/0242
USPC .................................................. 375/267, 340
See application file for complete search history.

(56) References Cited

U.S. PATENT DOCUMENTS

| | | | | |
|---|---|---|---|---|
| 5,675,344 | A | * | 10/1997 | Tong et al. ..................... 342/457 |
| 6,587,517 | B1 | * | 7/2003 | Li et al. .......................... 375/316 |
| 7,397,758 | B1 | * | 7/2008 | Hart et al. ...................... 370/208 |
| 8,169,993 | B2 | | 5/2012 | Huang et al. |

(Continued)

FOREIGN PATENT DOCUMENTS

WO    WO 2005/055543 A1    6/2005

OTHER PUBLICATIONS

Notification of Transmittal of the International Search Report and the Written Opinion of the International Searching Authority, or the Declaration for PCT International Application No. PCT/US2014/062393 (Jan. 26, 2015).

(Continued)

*Primary Examiner* — Don N Vo
(74) *Attorney, Agent, or Firm* — Jenkins, Wilson, Taylor & Hunt, P.A.

(57) ABSTRACT

Systems and methods are disclosed herein to provide improved channel estimation in a wireless data communication system, including but not limited to Multiple Input Multiple Output (MIMO) and Orthogonal Frequency Division Multiplexing (OFDM) communication systems. In accordance with one or more embodiments and aspects thereof, a channel estimation system is disclosed that regenerates a representation of the original transmitted signal from the received digital bitstream and selectively applies it to refine and improve channel estimation and signal equalization calculations using the data symbols contained within received frames. Such a system may offer improved capabilities such as more accurate signal reception, reduced bit error ratio, and improved Multi-User MIMO (MU-MIMO) reception.

22 Claims, 15 Drawing Sheets

(56) References Cited

U.S. PATENT DOCUMENTS

| | | | |
|---|---|---|---|
| 8,223,825 | B2 | 7/2012 | Lindoff et al. |
| 8,798,124 | B2 | 8/2014 | Lee et al. |
| 8,862,084 | B2 | 10/2014 | Carlsson et al. |
| 2004/0085917 | A1 | 5/2004 | Fitton et al. |
| 2008/0212659 | A1 | 9/2008 | Usui |
| 2008/0240265 | A1 | 10/2008 | Fechtel |
| 2010/0271932 | A1 | 10/2010 | Hwang et al. |
| 2011/0261675 | A1 | 10/2011 | Lee et al. |
| 2011/0280296 | A1 | 11/2011 | Wang et al. |
| 2012/0201320 | A1 | 8/2012 | Koike-Akino |
| 2012/0300680 | A1 | 11/2012 | Pietsch et al. |
| 2012/0320961 | A1 | 12/2012 | Pham et al. |

OTHER PUBLICATIONS

Commonly-assigned, co-pending U.S. Appl. No. 14/326,028 for "Methods, Systems, and Computer Readable Media for Determining a Metric of Radio Frequency Channel Quality for Idle Channels in LTE and LTE Advanced Networks," (Unpublished, filed Jul. 8, 2014).

Commonly-assigned, co-pending U.S. Appl. No. 14/308,680 for "Systems and Methods for Improved Wireless Channel Estimation," (Unpublished, filed Jun. 18, 2014).

"Error Vector Magnitude," http://en.wikipedia.org/wiki/Error_vector_magnitude, pp. 1-3 (Apr. 18, 2014).

Basir, "3GPP Long Term Evolution (LTE): Primary and Secondary Synchronization Signals (PSS & SSS) in LTE,", http://4g-lte-world.blogspot.com/2012/06/primary-and-secondary-synchronization.html, pp. 1-5 (Jun. 7, 2012).

Dahlman et al., "4G LTE/LTE-Advanced for Mobile Broadband," pp. 143-202, & 301-321 (2011).

Rayal, "Design How-To: An Overview of the LTE physical layer—Part II," Telesystem Innovations. EE Times, http://www.eetimes.com/document.asp?doc_id=1278137, pp. 1-4 (Jun. 20, 2010).

McKinley et al., "EVM Calculation for Broadband Modulated Signals," 64th ARFTG Conf. Dig., Orlando, FL., pp. 45-52 (Dec. 2004).

Dahlman, et al., "Chapter 3—OFDM Transmission," 4G LTE/LTE-Advanced for Mobile Broadband, pp. 27-44 (2011).

Non-Final Office Action for U.S. Appl. No. 14/326,028 (Oct. 28, 2015).

Notice of Allowance and Fee(s) Due and Examiner-Initiated Interview Summary for U.S. Appl. No. 14/308,680 (Oct. 15, 2015).

Non-Final Office Action for U.S. Appl. No. 14/308,680 (May 28, 2015).

\* cited by examiner

SYSTEMS AND METHODS FOR IMPROVED WIRELESS CHANNEL ESTIMATION

PRIORITY CLAIM

This application claims the priority benefit of U.S. provisional patent application Ser. No. 61/900,973, filed Nov. 6, 2013, the disclosure of which is incorporated herein by reference in its entirety.

TECHNICAL FIELD

The subject matter described herein relates generally to wireless data communication systems; and more particularly to systems and methods for estimating the properties of radio frequency (RF) wireless channels, and using these properties for equalization and data recovery purposes.

BACKGROUND

Modern wireless data communications systems can utilize the benefits of multiple transmit and receive antennas to improve both the range and data communications bandwidth. In particular, Multiple Input Multiple Output (MIMO) systems can utilize the spatio-temporal properties of the RF channel to transmit parallel but independent streams of data, greatly increasing the amount of data that can be transferred from a transmitter to a receiver. MIMO systems are therefore seeing widespread use in high-speed wireless digital transmission systems.

MIMO systems take advantage of the fact that radio frequency (RF) environments, particularly indoor RF environments, may contain large numbers of reflective and diffractive metallic objects, the effect of which is to impose multiple propagation modes on the RF channel existing between a transmitter and a receiver. Each propagation mode may be separately excited with an independent, uncorrelated RF signal; at the receiver, the signals occupying each propagation mode may be distinguished from each other and the original sets of uncorrelated RF signals may be extracted. The number of propagation modes available to a MIMO system is determined by the number of antennas at the transmitter and the receiver. With a sufficient number of transmit antennas, therefore, a MIMO transmitter may split a single stream of digital data into independent parallel streams and modulate each transmit antenna separately to transmit each parallel stream on a different propagation mode. Given an adequate number of receive antennas, and knowledge of the channel propagation modes, a MIMO receiver may separate and decode the parallel streams of data and may combine them to regenerate the original stream of digital data. The capacity of a MIMO system is therefore a multiple of the capacity of a conventional Single Input Single Output (SISO) system operating over the same RF channel.

FIG. 1 depicts an abstract representation of an RF environment containing MIMO wireless transmitter 101 with multiple transmit antennas 103 transmitting signals 106 to MIMO wireless receiver 102 with multiple receive antennas 104. A number of metallic objects (scatterers 107) may reflect and scatter signals 106. The presence of these scatterers may render it possible to separate and decorrelate the signal paths established between each pair of transmit and receive antennas. This in turn may cause the overall RF channel between transmit antennas 103 and receive antennas 104 to exhibit multiple channel propagation modes. (In FIG. 1, each propagation mode is depicted simplistically as a separate path between individual antenna pairs.) As previously noted, individual propagation modes may be used to transmit different portions of a digital data stream and increase the capacity of the system.

A MIMO channel in a RF wireless communication system with N transmit and M receive antennas may be represented as an N×M matrix of complex coefficients. Each coefficient represents the transfer function between an individual pair of transmit and receive antennas. A MIMO system cannot exploit more channel propagation modes than the lesser of the number of transmit and receive antennas. It may therefore be usual to set N=M so that the number of transmit and receive antennas is equal, and also equal to the number of channel propagation modes. In this case, the maximum number of parallel data streams that may be transmitted is also equal to N. Any receive or transmit antennas provided beyond this number may be used for improving the signal to noise ratio, but cannot be used to increase the system data bandwidth.

With reference to FIG. 2, an exemplary MIMO RF wireless communication system is depicted in simplified form. Such a system may comprise transmitter 101 and receiver 102. Transmitter 101 may accept a stream of digital transmit data 121 and process it using digital modulator 122, which may transform blocks of digital data to complex-valued digital modulation signals. These modulation signals may then be fed to transmit MIMO encoder 123, which may perform the space-time processing necessary to split up the transmit data stream into N individual component streams that may be converted to the analog domain by digital-to-analog (D/A) converters 124 and subsequently may be transformed to RF signals by RF up-converters 125, before being transmitted on at least N transmit antennas 126.

The signals generated by MIMO transmitter 101 may be transmitted over the RF channel 127, with the channel transfer function matrix being represented as [H]. Matrix [H] may have at least as many rows as there are transmit antennas 126 and further may have at least as many columns as there are receive antennas 129, and each element of [H] may represent the complex transfer function between an individual pair of transmit and receive antennas.

MIMO receiver 102 may utilize at least N receive antennas 129 to receive N different copies of the signals transmitted over the RF channel 127 and may pass them to RF down-converters 130, which may convert them to baseband for digitization by analog-to-digital (A/D) converters 131. The digitized signals may then be processed by receive MIMO equalization network 132, which may remove the effects of the channel matrix [H] to recover the original space-time coded signal transmitted on antennas 126. The equalized signal may then be passed to receive MIMO decoder 133 for space-time decoding to regain the modulated signals, which may then be further processed by receive demodulator 134 to produce receive data 135, which may be a regenerated version of the original transmit data 121.

It is apparent that MIMO equalizer 132 may play a key role in reception by compensating for the effects of RF channel 127 and extracting individual signal streams impressed into the various propagation modes of the channel matrix [H]. The equalization coefficients utilized by MIMO equalizer 132 may be entirely dependent on the channel matrix [H], which may have to be estimated at the receiver in order to receive the data. Estimation may be accomplished by preamble/pilot extractor 136, which may extract special training signals from the transmitted signal and pass them to MIMO channel estimator 137, which may use them to derive the equalization coefficients for MIMO equalizer 132.

It is understood that FIG. 2 is a simplified and abstract representation of a MIMO wireless transmitter and receiver, focusing only on aspects related to MIMO and channel estimation. Unrelated functions such as Medium Access Control (MAC) processing are omitted. It should further be understood that functions enhancing signal-to-noise ratios such as transmit precoding and beamforming, as well as receive diversity, are omitted for clarity.

Accurate estimates of the properties of the MIMO wireless channel that may exist between the receiver and transmitter may be used to determine the channel propagation modes, which may be used in turn to calculate the coefficients of the equalization matrices used by MIMO equalizer 132. This may aid in correctly decoding and separating the parallel data streams. A poor channel estimate may make it difficult or impossible to correctly separate the data streams, leading to a much higher error rate for the recovered data streams at the same signal level. Therefore, accurate channel estimation may be extremely important for MIMO systems.

The MIMO reception function may first determine the value of the channel matrix H using the known symbols in the preamble and pilot signals transmitted by MIMO transmitter 101; calculate an equalization matrix of complex coefficients corresponding to the H matrix; and may finally separate and equalize multiple streams of transmitted data by multiplying the received signal with the equalization matrix. (It should be understood that channel estimation may simply comprise the calculation of the equalization matrix, omitting the calculation of the intermediate [H] matrix.) Different methods of channel estimation are known: the simplest is the zero-forcing method, which consists of setting the equalization matrix to the inverse of the channel ([H]) matrix, while more complex methods may incorporate the noise statistics of the RF channel into the calculations. In all cases, however, it may be necessary to calculate the channel matrix H before data can be recovered.

In order to calculate the complex channel matrix H, a sequence of fixed, well-known and properly selected data may transmitted by MIMO transmitter 101 to MIMO receiver 102. MIMO receiver 102 may then calculate the channel matrix H that must be present for the original transmit data to have resulted in the data actually received, and may further convert this to an equalization matrix by various algorithms (e.g., zero-forcing, MMSE, sphere decoding). Due to distortion, transmit inaccuracy, and noise, it may not be possible to exactly calculate the channel matrix [H]; only estimates thereof may be obtained. Inaccuracies in the estimates may cause errors in the equalization matrix parameters, which in turn may increase the probability of errors in the decoded receive data. It therefore may be essential to make the channel estimates as accurate as possible in the face of noise and distortion, to maximize the probability of recovering the transmitted data.

In a packetized or framed wireless transmission protocol, examples of which may comprise IEEE 802.11 WLANs or 3GPP Long Term Evolution (LTE) protocols, channel estimation may initially be performed using special transmit data values referred to as training sequences. These special data values may be transmitted within the frame preamble at the start of a packet or frame. In the exemplary instance of IEEE 802.11, the data values transmitted may be referred to as the short and long training sequences respectively. Training sequences may support multiple functions, including but not limited to estimating the clock frequency and phase used by the transmitter, calculating the base received signal strength indication (RSSI) so that receiver RF gains may be configured, and estimating RF channel 127 interposed between MIMO transmitter 101 and MIMO receiver 102. MIMO RF channel 127 may be accurately estimated by measuring the baseband modulated representation of the actual training sequences received by MIMO receiver 102 and comparing it to the known value of the training sequences originally transmitted by MIMO transmitter 101. Once the MIMO channel has been estimated using these known signal values by channel estimator 137 and MIMO equalization network 132 has been loaded with the corresponding equalization matrix coefficients, MIMO transmitter 101 may send user data through MIMO channel 127. MIMO receiver 102 may use its MIMO equalizer to separate the streams and recover the data.

A significant issue that may be encountered in practice is that noise in MIMO RF channel 127, as well as signal noise within the circuits of MIMO transmitter 101 and MIMO receiver 102, may cause the coefficients of the equalization matrix calculated by channel estimator 137 to vary randomly from the actual (i.e., theoretically ideal) values. These variations may particularly impact the higher-order modulations (e.g., 64 and 256 Quadrature Amplitude Modulation, or QAM) and also larger frames, as these require very high signal-to-noise ratios and thus may be more susceptible to inaccuracies in the estimated channel. It may be observed that noise particularly affects the coefficients of the equalization matrix that have lower absolute values relative to the other coefficients; in the physical sense, these coefficients correspond to propagation paths between antenna pairs which have high path loss. The presence of noise in these coefficients may decrease the signal to noise ratio (SNR) and further may increase the correlation between propagation modes in MIMO channel 127, and may reduce the probability of error-free MIMO decoding.

Another significant issue that may occur is that, over time, the channel estimate may become inaccurate due to changing propagation conditions. For example, if MIMO transmitter 101 and MIMO receiver 102 move relative to each other, or if the positions of scatterers 107 changes, the statistical properties of the MIMO channel 127 (more specifically, the coefficients of the channel matrix [H]) may differ significantly from the initial estimate. This may induce errors in the decoded receive data stream, as the equalization matrix coefficients may no longer be accurate.

Yet another issue may be caused by the fact that channel estimation is begun afresh, without regard to previously calculated estimates, every time a frame is received. As a result, the data available from previous channel estimation calculations is forgotten and not used to improve channel estimation for successive frames.

To refine the channel estimate over time, pilot symbols may be introduced into the data stream. These may be known signal combinations that are periodically inserted into the transmitted RF by MIMO transmitter 101. As the pilot symbol values are known in advance, MIMO receiver 102 may use the pilot data to recalculate the RF channel matrix [H], and may thereby periodically refine the channel estimate as well as the equalization matrix.

An issue with this approach, however, may be that the number of pilot symbols is small relative to the number of data symbols. This may be done to maximize the transmission efficiency and data throughput, as the incorporation of pilot symbols may proportionately reduce the capacity available for data. Another issue may be that the pilot symbols are much shorter and sparser than the training sequences transmitted in the preamble; therefore, the accuracy of channel estimation performed using the pilot symbols may be much less than that available from the training sequences. In fact, it may be observed in practice that the presence of noise and distortion may actually result in increased errors when using the channel estimates from the pilot symbols, as compared to not using them at all. Channel estimation may therefore take the sparsity of the pilot symbols into account when refining the channel estimate over time.

Digital wireless systems employ higher channel bandwidths in order to transfer increased amounts of data. With increased bandwidths, however, the RF channel may not be regarded as frequency-flat; i.e., the channel frequency response may not be uniform across the entire transmission bandwidth and selective fading may occur. Further, variation in propagation delays of the different paths through the transmission medium, for example paths 106 in FIG. 1, may become large relative to the interval between individual modulation symbols. This may result in inter-symbol interference.

Orthogonal Frequency Division Multiplexing (OFDM) modulation may be used to address these issues in high-bandwidth digital wireless data systems. An OFDM system subdivides the available channel bandwidth into small segments (referred to as subcarriers), and may transmit different blocks of data over each subcarrier separately. As the frequency range occupied by individual subcarriers is small, the frequency response for each individual segment or subcarrier can be regarded as flat. Further, as multiple symbols may be transmitted on the different subcarriers within one symbol period, it may be possible to substantially increase the symbol period while still transmitting the same amount of data, which will eliminate problems due to inter-symbol interference and symbol smearing.

FIG. 3 shows a simplified representation of a single OFDM frame, where horizontal axis 157 represents time and vertical axis 158 represents frequency. As depicted, an OFDM frame is a 2-dimensional structure that may comprise comprising m symbols each of fixed time duration, with each symbol comprising n subcarriers each of fixed frequency width. For example, the IEEE 802.11 symbol duration is either 4.0 or 3.6 microseconds and 52 subcarriers are used with frequency widths ranging from 78.125 kHz to 312.5 kHz. The OFDM frame may comprise a preamble 150, which may further consist of short training sequence 152, long training sequence 154, and other preamble data 154. After preamble 150, the OFDM frame may contain one or more symbols 151 of payload information. The payload may be divided up into data 155 and pilot signals 156. In the case of IEEE 802.11, there may be 48 data subcarriers and 4 pilot subcarriers.

OFDM modulation may be beneficially used in conjunction with MIMO systems, as the increased symbol duration relative to the transmission bandwidth may enable the MIMO system to handle significantly larger delay spreads (i.e., time delay differences between the shortest and longest viable RF paths). In this case, multiple parallel streams of OFDM modulated data can be transmitted within each individual MIMO channel propagation mode. This is referred to as an OFDM MIMO system.

An example of an OFDM MIMO communication system is represented in FIG. 4. It may comprise OFDM MIMO transmitter 170 that may accept digital transmit data 121, encodes it using binary convolutional code (BCC) coder 171, and partitions the data to be mapped on to multiple MIMO streams using MIMO stream mapper 172. The individual streams of data may then be modulated on to subcarriers using OFDM modulators 173, after which MIMO space-time encoding may be performed using MIMO space-time encoder 174. The frequency-domain representation of the modulated subcarriers may then be converted to time-domain symbols and waveshaped using inverse Fast Fourier Transform (IFFT) and symbol shaper blocks 175. The shaped symbols may be converted to analog using D/A converters 124 and upconverted to RF signals using RF upconverters 125, before transmission on multiple antennas 126.

The MIMO OFDM signals generated from antennas 126 may then propagate through the RF channel (not shown for simplicity) and reach antennas 129 of MIMO OFDM receiver 181. These signals may be converted to baseband and digitized using RF downconverters 130 and A/D converters 131, after which the signal received from each antenna may be converted to the frequency domain using Fast Fourier Transform (FFT) blocks 176. The individual signal streams may be equalized using MIMO equalizer 177, which may remove the effects due to the space-time encoding and intervening MIMO transmission channel and restore the original space-time streams. The subcarriers comprising each space-time stream may then be demodulated using OFDM demodulators 178 and passed to MIMO stream demapper 179, which may transform the multiple space-time streams to a single data stream. Decoding of the encoded transmit data may be performed using Viterbi decoder 180, which may also correct bit errors that may be present in the received data due to noise and poor channel estimates and output the resulting receive data 135.

Synchronization and channel estimation may be performed by extracting preamble and pilot information from the received baseband signal with preamble/pilot extractor 136, which may supply these special signals to clock synchronization logic 182 (to align receive and transmit clocks) and to MIMO channel estimator 137. MIMO channel estimator 137 may produce an estimate of the channel matrix [H], as well as calculating the equalization matrix parameters that may be passed to MIMO equalizer 177. This calculation may be similar to that depicted in FIG. 5, wherein equalization [U] matrix 215 is calculated within MIMO receiver 214 from preamble and pilot information received by antennas 213 after being transmitted by MIMO transmitter 210 over antennas 211 and traversing MIMO RF channel 212. The various terms in the equalization matrix (e.g., $U_{11}$, $U_{22}$, etc.) may approximately correspond to different "branches" of the MIMO RF channel. The overall equalization [U] matrix may be regarded, in a simplified view, as a matrix which is to be multiplied into the signals received from the receive antennas in order to reverse the effect of the space-time encoder and MIMO RF channel upon the originally transmitted signal streams, and thereby recover the streams.

In a standard MIMO receiver, channel estimation may be performed as a single operation over the entire RF channel, as it is assumed that the channel is uniform across its width. In an OFDM MIMO case, however, this assumption may not hold true. OFDM MIMO receiver 181 may hence perform channel estimation separately for each individual subcarrier, and may also compute an equalization matrix separately for each subcarrier. For example, in the case of IEEE 802.11 WLANs, MIMO channel estimator 137 may calculate 48 different channel estimation matrices [H] (i.e., one for each data subcarrier) and supply 48 different equalization matrices to MIMO equalizer 177. MIMO equalizer 177 may then process each FFT bin using a separate respective equalization matrix corresponding to each subcarrier. In this situation, the training sequences in the frame preamble may be specially constructed to facilitate this, by using orthogonal signal sequences for each subcarrier within the preamble to improve the accuracy of channel estimation.

A significant issue that may be encountered in practice with wireless communication systems such as IEEE 802.11 systems is maintaining accuracy of channel estimation over very long frames. For example, IEEE 802.11 systems support aggregated Medium Access Control (MAC) Protocol Data Units (PDUs) (i.e., A-MPDUs) that comprise multiple MAC frames concatenated together with a single preamble at the start. Such A-MPDUs may become very long, containing hundreds of thousands of bytes of information. However, as an A-MPDU may only contain a single preamble, there may only be one initial training sequence that may be used for channel estimation. Further, the pilot symbols may not be adequate for improving the channel estimate adequately to eliminate the bit errors. As a result, the channel estimate calculated at the beginning of the A-MDPU may degrade substantially towards the end of the A-MPDU, leading to bit errors in the received data.

As the bandwidth needs of digital wireless systems further increase relative to the available RF spectrum, Multi-user MIMO (MU-MIMO) technology is being introduced to enhance the capacity of OFDM MIMO systems. MU-MIMO may involve multiple OFDM MIMO transmitters that simultaneously transmit different data streams to the same receiver using the same RF channel at the same time, or may involve multiple OFDM MIMO receivers that simultaneously receive different transmissions from a single OFDM MIMO transmitter over the same RF channel. MU-MIMO exploits the fact that different channel propagation modes exist between every MIMO transmitter and receiver pair. Normally, the transmission of multiple signals within the same RF channel bandwidth at the same time may result in mutual interference between the signals, and a receiver may not be able to distinguish one signal from another. However, if the channel matrix existing between every transmitter/receiver pair is accurately known, uncorrelated propagation modes may be selected for transporting data between every different transmitter/receiver pair. In this case, the receiver(s) may use this information to maximize the signal-to-noise ratio (SNR) of the desired signal and minimize the SNR of the undesired (interfering) signals. A step of successive interference cancellation may then be employed to remove all of the undesired signals and extract the data from the desired signal, as the propagation modes are uncorrelated.

As represented in FIG. 6, MU-MIMO receiver 200 may receive signals 204 simultaneously from MU-MIMO transmitters 201, 202, 203. The presence of many scatterers 205 in the RF propagation environment may cause the propagation modes existing between MU-MIMO receiver 200 and each of MU-MIMO transmitters 201, 202, 203 to be different. By exciting these different propagation modes with distinct signals at each of the transmitters, and decorrelating and extracting them at the receiver, it may be possible to simultaneously transmit information from each of the transmitters 201, 202, 203 to receiver 200 over the same frequency band. It may be understood that the scenario depicted in FIG. 6, namely multiple transmitters communicating to a single receiver, is also applicable in the reverse direction—i.e., multiple receivers receiving signals from a single transmitter.

The implementation of MU-MIMO, however, may demand very accurate knowledge of the RF channel existing between each transmitter/receiver pair. Without a sufficiently accurate channel estimate, it may not be possible to identify the propagation modes used for data transmission between each pair, and thus to separate the different streams of data. The training sequences within the preamble may be relatively short (e.g., 16 microseconds for IEEE 802.11) and may not provide sufficient data for an accurate channel estimate. Further, the impact of Doppler shifts due to relative motion of different transmitter/receiver pairs, or channel changes due to changes in the RF environment, are greatly increased. Therefore, MU-MIMO systems may require the initial channel estimate and corresponding equalization matrices to be calculated more accurately, and may further demand that these values be constantly updated over time. Otherwise, as the computed channel estimates deviate further away from the actual RF channel over time, the error rate will increase, and eventually the signal may not be received. This may be a particular problem for long frames, such as frame bursts. In this case, the RF channel calculated at the start of the frame may be quite different from the RF channel that exists at the end of the frame or burst, resulting in the frames at the end of the burst being lost. However, as mentioned previously, the pilots may be too sparse to provide accurate channel estimates, and a better means of updating the channel estimates over time may be required to support MU-MIMO.

It may be apparent from the foregoing discussion that channel estimation is important for efficient high-bandwidth wireless communication. It may further be apparent that more advanced technologies such as OFDM MIMO and MU-MIMO may greatly increase the need for accurate and reliable channel estimation and equalization. However, the initial channel estimates that may be obtained from the training sequences embedded in the preamble may not be adequate for long OFDM-MIMO frames due to changes in the statistical properties of the RF channel over time. In addition, the substantially increased need for accurate channel estimation and equalization in MU-MIMO may not be addressed by relatively short training sequences, and the drift in the channel properties may not be adequately compensated for by the pilot signals.

There is hence a need for improved MIMO wireless channel estimation and equalization systems and methods. A system that can increase the number of symbols used for channel estimation beyond those allocated in the frame preamble may be desirable, for example by utilizing the symbols transmitted in the frame payload. A system providing improved channel estimation for use with long received frames, such as IEEE 802.11 A-MPDUs, may be desirable. Further, a system that can maintain and refine a channel estimate for a given transmitter/receiver pair over time may be desirable. Such a system may preferably improve the quality of the initial channel estimate, eliminating channel noise from the estimate, and may preferably track changes in the MIMO RF channel statistical properties over time to permit larger frames to be handled. Finally, it may be desirable for such a system to be realized without significant additional hardware cost and complexity.

SUMMARY

Systems and methods are disclosed herein that may provide improved techniques for channel estimation and equalization in wireless data communication devices, systems and networks. Such techniques may enable the improved generation of channel estimates and corresponding equalization matrices, and further may allow these channel estimates and equalization matrices to be updated and modified to accommodate changing channel conditions. The systems and methods disclosed may further improve the accuracy and reliability of the generated channel estimates and equalization matrices, and may also allow these channel estimates and equalization matrices to be retained and utilized over multiple frames.

In accordance with one embodiment, an OFDM MIMO wireless datapath is disclosed that may enable channel estimation to be performed utilizing the data portions of the signal waveform, instead of (or in addition to) dedicated training sequences or pilot symbols. The wireless datapath may contain: receive RF processing and Analog-to-Digital (A/D) functions; receive FFT and signal processing logic; MIMO equalization logic to remove the effects of the transmission channel; OFDM demodulator logic converting OFDM symbol/subcarrier combinations to digital bits; MIMO space/time demapping and Viterbi decoding logic that may combine multiple streams into a single stream, perform error correction, and regenerate the transmitted bitstream; coding and MIMO stream mapping logic that may convert the regenerated bitstream back to multiple encoded bitstreams; OFDM modulator logic that may modulate these bitstreams on symbol/subcarrier combinations to regenerate a copy of the original transmitted modulation streams; MIMO space/time encoding logic that may convert the symbol/subcarrier combinations into baseband form; and MIMO channel estimation logic that may calculate equalization matrices, and may further use the locally regenerated transmit data to do so.

Preferably, the MIMO channel estimation logic may utilize the preamble for calculating initial equalization matrices, and may further utilize a regenerated copy of the data portion of the transmitted frame together with the actual received data for refining and improving the equalization matrices. The MIMO channel estimation logic may preferably include buffering, filtering and averaging functions for combining newly calculated equalization matrices with previous data. The channel estimation logic may further preferably include functions to avoid updating the channel estimates when the received data is known to be invalid or has a large number of errors, e.g., if the matrix representation of the regenerated transmit data is ill-conditioned, or the received packet Frame Check Sequence (FCS) indicates that errors have occurred.

Advantageously, the channel estimate update may be performed using a filtering or averaging function to provide improved resistance to channel and device noise.

Advantageously, the Error Vector Magnitude (EVM) calculated from the regenerated transmit data and the received signal may be used as a condition of channel estimate update.

Advantageously, a portion of the transmitter datapath normally used for transmitting data over the RF channel may be used during reception to regenerate the signals for channel estimation purposes. This may lead to a reduction in the cost and complexity of calculating channel estimates from the data portion of received frames.

In accordance with an aspect of an embodiment, the MIMO channel estimation logic may force small-magnitude elements of the equalization matrices calculated from the training sequences to zero. This may have the benefit of eliminating non-contributory branches within the equalization matrices and may thereby reduce the impact of channel and device noise.

In accordance with an aspect of an embodiment, the channel estimates that may have been calculated and updated from previous packets may be stored for use while receiving future packets.

Advantageously, the stored channel estimates may be combined into channel estimates newly calculated from the training sequences, pilot symbols and data symbols of these future packets and may thereby provide a more accurate estimate.

Advantageously, channel estimates may be stored separately for each transmitter that may be communicating with a particular receiver in a memory, and may be retrieved for use with future received data from that transmitter.

BRIEF DESCRIPTION OF THE DRAWINGS

The detailed description herein of the features and embodiments are best understood when taken in conjunction with the accompanying drawings, wherein.

DETAILED DESCRIPTION

Figure 7A:
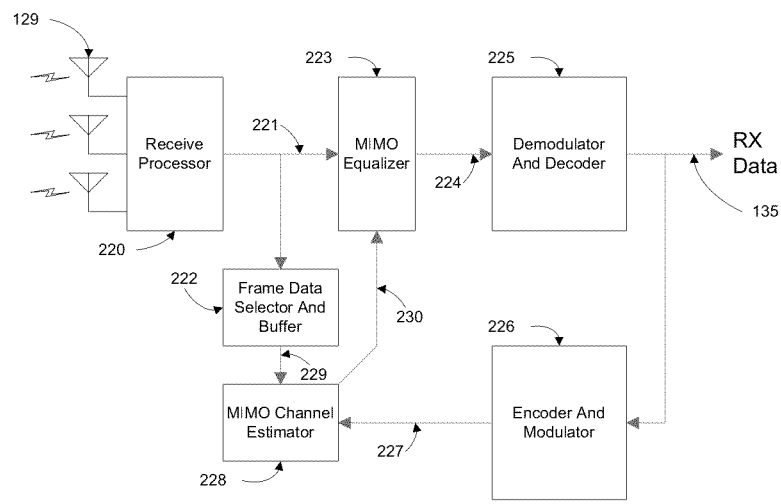
FIG. 7A depicts a simplified view of a system for improved channel emulation, wherein received data are re-modulated for use in channel estimation, together with selected and buffered received signals.

FIG. 7A shows a simplified view of a possible embodiment of a wireless channel estimation system that may be suitable for general digital Multiple Input Multiple Output (MIMO) communications. As represented, the embodiment may comprise MIMO receive processor 220 with antennas 129 that receive MIMO radio frequency (RF) signals and convert them using functions that may include amplification, filtering and downconversion to baseband signals 221. Baseband signals 221, which may comprise a stream of modulated symbols, may then be fed to MIMO equalizer 223, which may remove the effects of the MIMO RF channel to regenerate a version 224 of the original transmitted MIMO signals, which may be converted to received digital data 135 by demodulator and decoder 225. Digital data 135 may then be fed back to encoder and modulator 226 to re-create a representation 227 of the originally transmitted modulated symbols, but generated from the locally received and decoded data. Re-created modulated symbols 227 are passed to MIMO channel estimator 228 for use in refining the channel estimation process.

A copy of the baseband signals 221 may also be passed to frame data selector and buffer 222, which may act to select portions of baseband signals 221 and store them in internal buffers to delay them before processing. Delayed copies 229 of selected baseband signals 221 may then be fed to MIMO channel estimator 228 for use in the channel estimation process.

MIMO channel estimator 228 may accept delayed copies 229 of received baseband signals 221, as well as locally re-created signals 227 obtained from decoded data bits 135, and may use these signals to perform channel estimation by any of the techniques known in the art, one example being zero-forcing. In this case re-created signals 227 may represent expected values of the transmitted signals, and delayed received signal copies 229 may represent the actual values of the received signals that correspond to these transmitted signals, but modified by passing through the MIMO RF channel. Channel estimator 228 may then perform a channel estimation calculation using these two signals to produce MIMO equalization parameters 230, which may be fed to MIMO equalizer 223 to perform channel equalization.

The amount of delay represented by frame data selector and buffer 222 may be chosen such that received signals 221 are time-shifted to match up with their corresponding re-created signal copies 227. That is, the delay interposed by frame data selector and buffer 222 may exactly equal the delays interposed by MIMO equalizer 223, demodulator and decoder 225, and encoder and modulator 226. In this case, when the re-created signals 227 arrive at MIMO channel estimator 228, the corresponding original received signals 229 may also simultaneously arrive at MIMO channel estimator 228, and the estimation calculations may be successfully performed.

Figure 1:
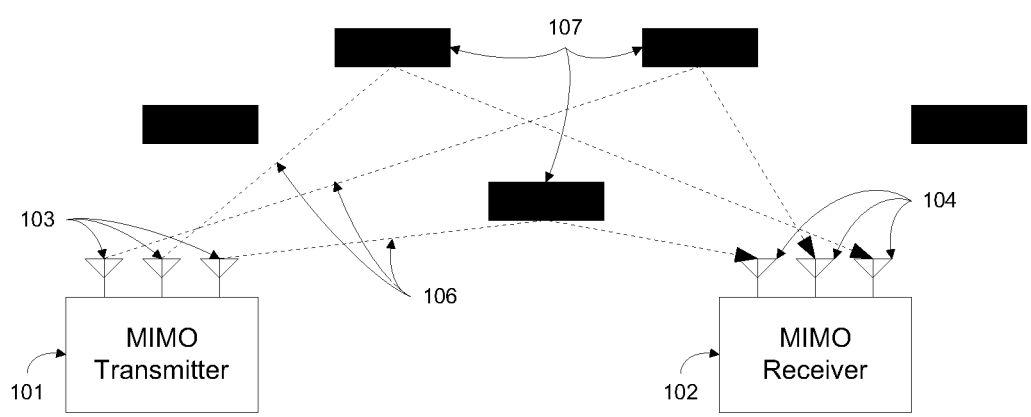
FIG. 1 shows a simplified representation of a MIMO transmitter and MIMO receiver operating in an RF channel environment.
Figure 2:
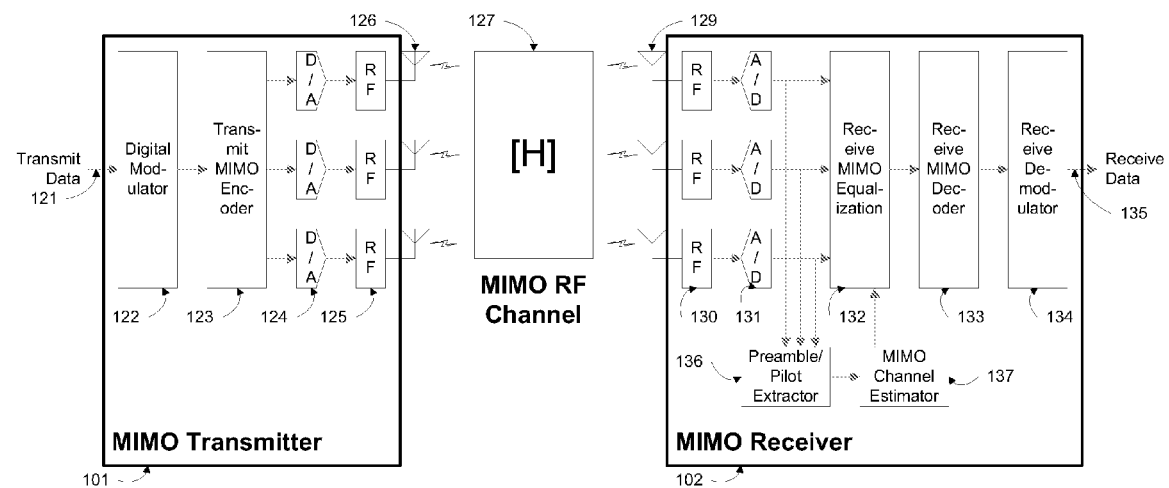
FIG. 2 represents an aspect of a MIMO transmitter transmitting signals over a MIMO RF channel to a MIMO receiver.
Figure 3:
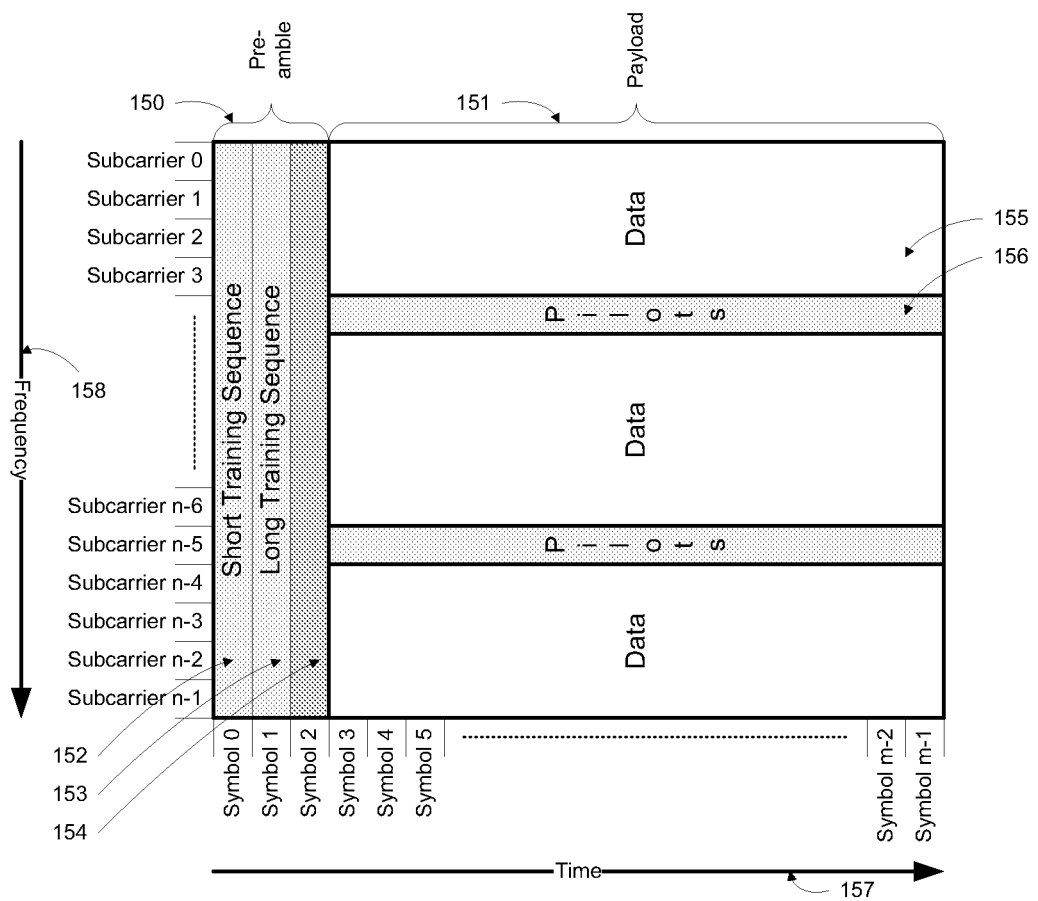
FIG. 3 depicts a simplified view of an OFDM frame, including training sequences and pilot symbols.
Figure 4:
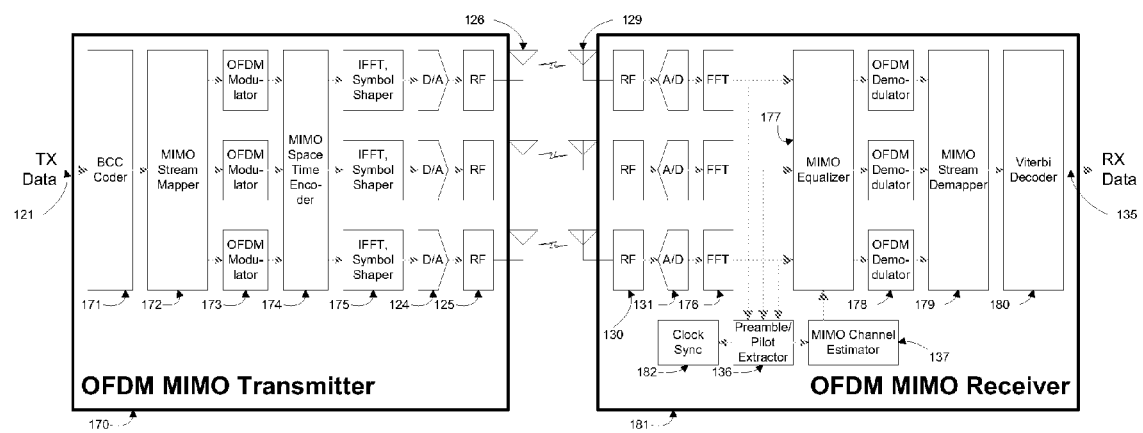
FIG. 4 depicts an illustrative block diagram of an OFDM MIMO transmitter and an OFDM MIMO receiver.
Figure 5:
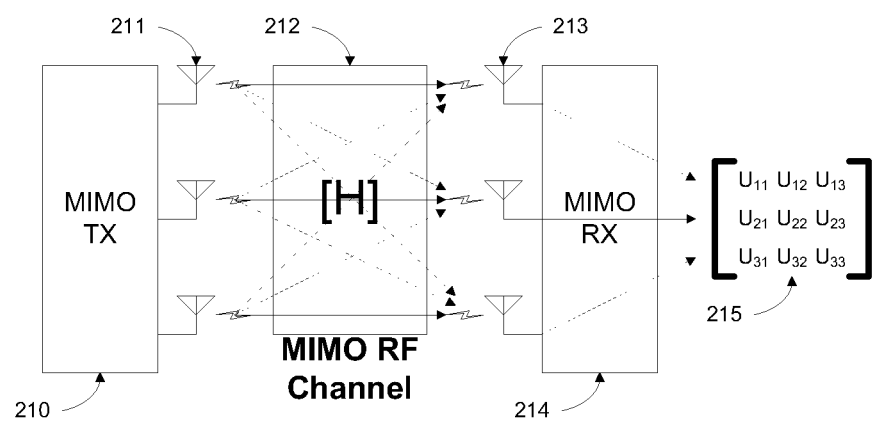
FIG. 5 is an exemplary diagram of a MIMO transmitter communicating to a MIMO receiver and showing the branches of the equalization matrix thereby.
Figure 6:
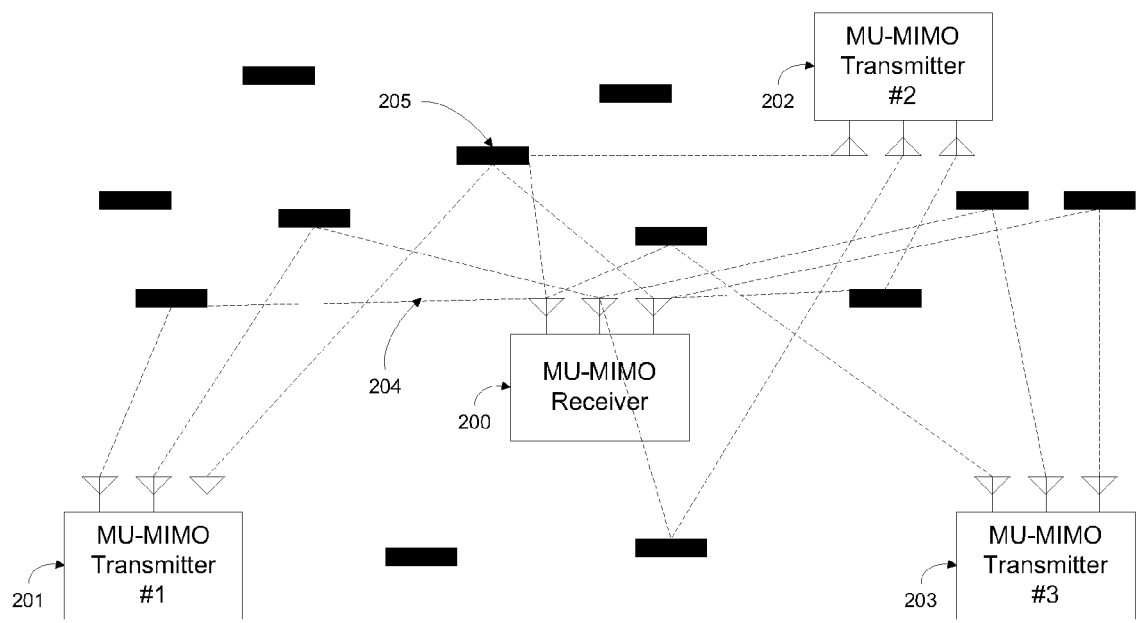
FIG. 6 shows a simplified representation of an MU-MIMO RF environment, comprising multiple MU-MIMO RF transmitters concurrently transmitting signals to a MU-MIMO RF receiver.
Figure 7B:
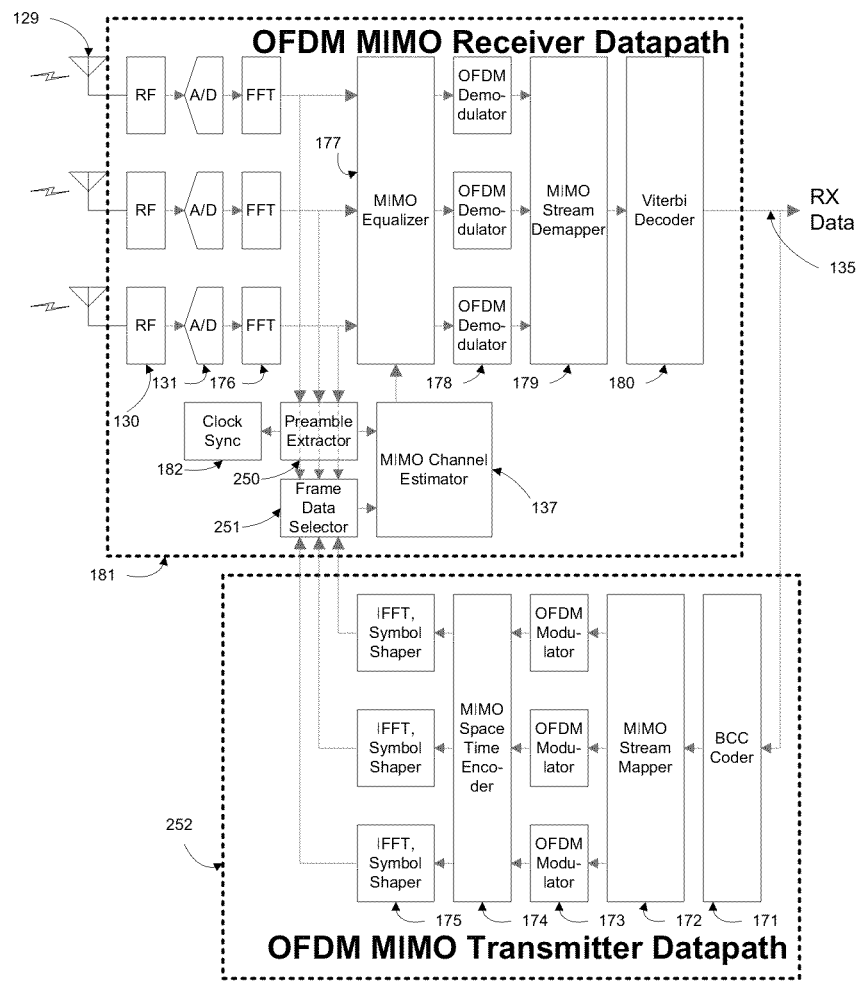
FIG. 7B depicts an exemplary aspect of an OFDM MIMO receiver datapath, with a portion of an OFDM MIMO transmitter datapath regenerating symbol waveforms from recovered data.

With reference to FIG. 7B, an embodiment of a wireless channel estimation system that may be suitable for communications protocols such as IEEE 802.11 is shown. The embodiment may comprise Orthogonal Frequency Division Multiplexing (OFDM) Multiple-Input-Multiple-Output (MIMO) receiver datapath 181 and a portion 252 of OFDM MIMO transmitter datapath 170 (previously depicted in FIG. 4). In a simplified view, receiver datapath 181 may comprise antennas 129 that receive MIMO radio frequency (RF) signals and feed them to RF processors 130 for functions that may include amplification, filtering and downconversion to intermediate frequency (IF) or baseband. These signals may then be fed to analog-to-digital (A/D) converters 131 for digitization and processed by Fast Fourier Transform (FFT) blocks 176, which may transform them into subcarriers in the frequency domain. These subcarriers may be passed to MIMO equalizer 177, which may implement a bank of digital filters for signal equalization to remove the effects of the MIMO RF channel, and may thereby regenerate the original transmitted MIMO signals. There may be a separate filter for each 'leg' of the MIMO transfer function, and the coefficients of these filters may be obtained from the channel estimation procedure (e.g., as represented previously in FIG. 5).

The equalized signals may then be fed to OFDM demodulators 178 for conversion from the symbol space to binary streams; these streams may be fed to MIMO stream demapper 179, which may reverse the space/time mapping imposed on the data streams by the transmitter and combine all the streams into a single coded stream. The coded stream may be further processed by decoder 180, which may be a Viterbi decoder for error detection and correction, to produce the final received data bitstream 135. Bitstream 135 may be regarded as a regenerated version of the original bitstream that was fed to the MIMO transmitter (which may correspond to 170 in FIG. 4). The accuracy of the regenerated bitstream may be dependent on the accuracy of the filter coefficients that may be set into MIMO equalizer 177, and therefore it may be essential to estimate the properties of the channel as accurately as possible.

Preamble extractor 250 may monitor the digitized data and may synchronize to and extract the known and predefined training sequences that may be embedded into the frame preamble, and also may extract pilot symbols that may be embedded into the frame data. The extracted information may be supplied to clock synchronization logic 182 to synchronize the receive and transmit clocks, and may also be supplied to MIMO channel estimator 137. MIMO channel estimator 137 may utilize the training sequences to obtain an initial channel estimate and may further derive MIMO equalization parameters from the channel estimate, which may be supplied to MIMO equalizer 177 for the signal equalization purposes previously referenced.

In addition to being output as the received data, regenerated digital bitstream 135 may be fed back to a subset 252 of the transmitter datapath that is the local companion to receiver datapath 181. The bitstream may be encoded by coder 171, which may be a Binary Convolutional Code (BCC) coder, and then may be passed to MIMO stream mapper 172 for mapping into multiple parallel streams. These streams are passed to OFDM modulators 173 for conversion from the digital domain into the modulated subcarrier (frequency) domain; once converted to subcarriers, MIMO space/time encoder 174 may map the various streams into the transmission modes of the RF channel, after which inverse Fast Fourier Transform (IFFT) functions 175 may convert the subcarriers into time-domain symbols. The time-domain symbols may resemble the original time-domain data symbols transmitted by the distant transmitter (not shown in the diagram).

The regenerated time-domain symbols may be buffered and selected by frame data selector 251, which may also buffer and select the actual received data symbols output by FFT blocks 176. This data may be supplied to MIMO channel estimator 137, which may use the actual and regenerated data to estimate the channel and calculate MIMO equalization parameters, which may also be supplied to MIMO equalizer 177.

The original values of the training sequence symbols that may be embedded within the frame preamble may be well known in advance and may not have to be regenerated. Preamble extractor 250 may therefore merely supply the values of the actual training sequence symbols, as received, to MIMO channel estimator 137, which may obtain the estimated channel by any of the techniques known in the art, one possible technique being zero-forcing. Further, the training sequence symbols may be preselected to be orthogonal and invertible (i.e., the matrix representing the training sequence symbols is well-conditioned), thereby ensuring that a channel estimate can always be obtained.

The zero-forcing equalization matrix may be obtained using the following calculation:

$$H = Y * X^{-1}$$

$$H_{zf}^{\dagger} = (H^H \times H)^{-1} * H^H$$

where Y is the matrix representing the actual value of a set of received symbols, X is the matrix representing the originally transmitted value of the same set of received symbols, and H is the calculated channel matrix. Further, $H^H$ is the matrix conjugate transpose and $H^{-1}$ is the matrix inverse, respectively. $H_{zf}^{\dagger}$ is the zero forcing equalization matrix.

While the training symbols are fixed and well known, the frame data may not be known or predictable in advance. Frame data selector 251 may hence supply both the regenerated and the actual data symbols to MIMO channel estimator 137. Further, it may not possible to ensure that the frame data is invertible, i.e., the matrix representation of the data is not well-conditioned. If the matrix representing a particular set of space-time frame data symbols is not well-conditioned, it may not be possible to obtain a channel estimate from that set. However, other sets of frame data symbols may be well-conditioned and may yield a channel estimate. Therefore, frame data selector 251 may perform a condition check on the regenerated signal matrix to verify that it is in fact well-conditioned and invertible, before supplying a set of data to MIMO channel estimator 137 to perform the channel estimation calculation. If the regenerated signal matrix is not well-conditioned, frame data selector 251 may discard the data and not supply it to MIMO channel estimator 137, which may in turn refrain from calculating a new channel estimate, instead retaining the previous calculation.

It may be observed in practice that the zero-forcing equalization matrix contains several terms that are close to zero in absolute magnitude and make little positive contribution, while the remainder of the terms may be much larger in magnitude and contribute materially. This may be comprehended with the aid of FIG. 5; as previously mentioned, the zero-forcing equalization U matrix 215 contains terms, each of which may be regarded as corresponding to a separate 'branch' of the channel between transmitter and receiver. Terms in the equalization matrix that are nearly zero in absolute magnitude may correspond to branches that have high path loss and transfer very little signal energy. As such, the noise contribution of these branches may greatly outweigh their signal contribution.

In an aspect of an embodiment, therefore, the terms of the zero-forcing equalization matrix that have an absolute magnitude close to zero may preferably be forced to zero. This may eliminate most of the noise contribution of the corresponding signal branches without significantly affecting the signal level. The overall effect may be to create a channel estimate and equalization matrix that advantageously increases the signal-to-noise ratio and consequently reduces the bit error ratio.

Figure 8:
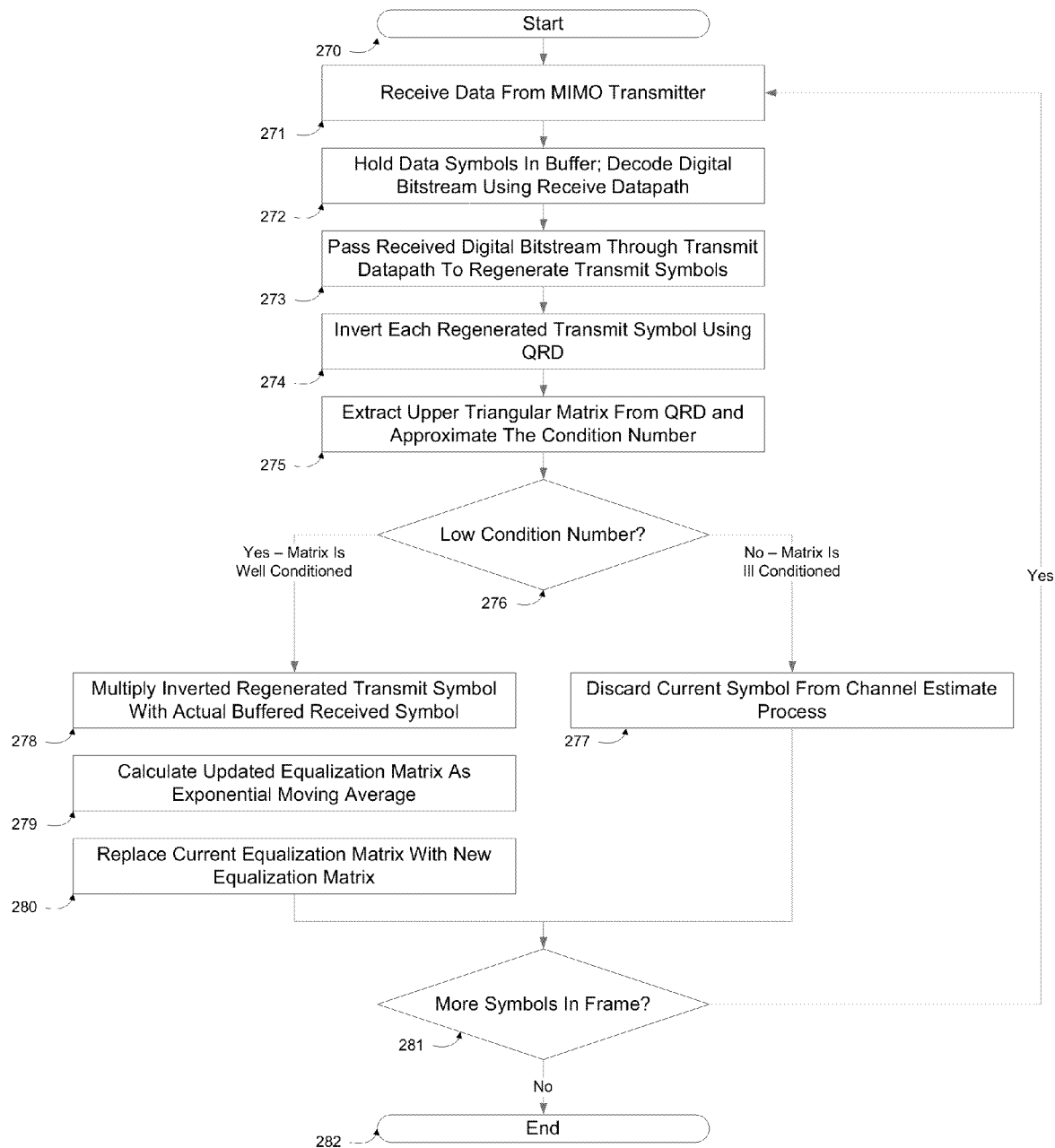
FIG. 8 provides a flow chart exemplifying the calculation of equalization matrices using recovered data.

In accordance with an aspect of an embodiment, it may be preferable to update the channel estimates and equalization matrices using error-corrected received data (in addition to the training sequences in the preamble), provided that the received data is suitable for calculating an improved channel estimate. FIG. 8 depicts a flowchart for an exemplary procedure for computing new equalization matrices from the received data, determining that the data is acceptable for this purpose, and updating the current channel estimate with a better version. The procedure may comprise the steps of:

a) At step 270, beginning the procedure, possibly upon the commencement of reception of a packet and after the initial channel estimate and equalization matrices have been calculated from the training sequences in the preamble;

b) At step 271, receiving frame payload data from at the MIMO receiver as a stream of matrices;

c) At step 272, holding received data symbols in a buffer, and also decoding these data symbols using a receive datapath to produce a received digital bitstream;

d) At step 273, passing the received digital bitstream through a portion of the transmit datapath to regenerate the original transmitted symbols as a stream of matrices;

e) At step 274, inverting each regenerated transmit symbol, possibly using a QR decomposition (QRD) calculation;

f) At step 275, extracting the upper triangular matrix from the QRD and approximating the condition number of the matrix as the ratio of the maximum and minimum diagonal values of the upper triangular matrix;

g) At step 276, checking whether the approximate condition number is low (i.e., less than the number of spatial streams), indicating a well-conditioned matrix representing the received data symbol;

h) At step 277, if the approximate condition number is high, discarding the currently received data symbol from the buffer as well as the results of the channel estimation computations (i.e., not updating the equalization matrices on the basis of that symbol);

i) At step 278, if the approximate condition number is high, multiplying the inverted regenerated transmit symbol matrix obtained at step 274 with the actual buffered receive symbol matrix to obtain a new estimate of the zero-forcing equalization matrix;

j) At step 279, calculating an updated equalization matrix, possibly as an exponential moving average of the current equalization matrix and the new estimate of the equalization matrix from step 278;

k) At step 280, replacing the current equalization matrix with the updated equalization matrix for use in the successively following symbol;

l) At step 281, checking if there are more symbols to be received in the frame, and repeating the procedure from step 271 if so; and j) At step 282, terminating the procedure if there are no more symbols in the frame.

Generation of channel estimates and associated equalization matrices by MIMO channel estimator 137 may take different forms. For example, an exponential weighted moving average procedure may be used, wherein a weight parameter may be used to combine a previously calculated equalization matrix with a newly calculated equalization matrix to create a new aggregate equalization matrix. This exponential weighted moving average procedure may be represented as follows:

$$\text{updated matrix} = (1-\text{gain})*\text{previous matrix} + \text{gain}*\text{new matrix}$$

where 'gain' may represent the weighting factor governing the combination procedure; for instance, a 'gain' of 1 means that the updated equalization matrix is simply the newly calculated matrix. In practice a 'gain' of 0.1 may be selected to provide a balance between fast convergence and resistance to ill-conditioned matrices that may not be detected by the approximate condition check performed at steps 275 and 276.

According to another aspect of an embodiment, a more accurate condition number may be calculated for the matrix representing the received data symbol at step 275, instead of approximating the condition number. The accurate condition number may be calculated as the ratio of the maximum and minimum singular values of the QRD matrix. Calculating a more accurate condition number in this way may provide an improved determination of whether the matrix is well-conditioned, and may thereby permit the gain of the exponential weighted moving average procedure to be increased. This may in turn improve the convergence of the algorithm and reduce the overall bit error ratio.

Figure 9:
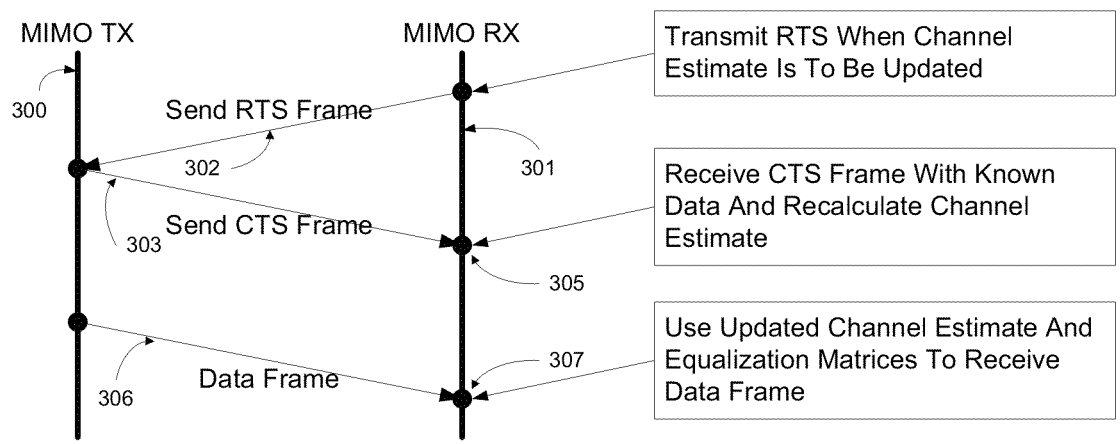
FIG. 9 represents the steps of an exemplary RTS/CTS exchange wherein channel estimation calculations are performed on known data and subsequently used for receiving data frames.

In accordance with another aspect of the subject matter described herein, it may be possible to trigger the generation of frame data that is partially or completely known in advance. In FIG. 9, an example of a Request To Send/Clear To Send (RTS/CTS) exchange, such as may be used in the IEEE 802.11 protocol, is depicted as occurring between a MIMO transmitter and a MIMO receiver, wherein the MIMO transmitter may be required to transmit data frames to the MIMO receiver. Line 300 represents the steps followed by the MIMO transmitter, and line 301 represents those for the MIMO receiver. These steps may comprise: at 302, transmitting an RTS control frame from the MIMO receiver to the MIMO transmitter when a channel estimate is desired; at step 303, responding with a CTS control frame from the MIMO transmitter to the MIMO receiver; at step 305, receiving the CTS frame and calculating a channel estimate and corresponding equalization matrix using the known data within the CTS frame; at step 306, transmitting a data frame from the MIMO transmitter to the MIMO receiver; and at step 307, using the updated channel estimate and equalization matrix to receive and process the data frame.

The RTS/CTS exchange may facilitate the efficient estimation of the channel and calculation of the equalization matrix because virtually the entire contents of a CTS frame received in response to an RTS frame may be known in advance. Therefore, the CTS frame may be used in a similar manner to the training sequences within a preamble. Further, the protocol being used between the MIMO transmitter and MIMO receiver, which may be the IEEE 802.11 protocol, may require that every RTS frame be responded to by a CTS frame. It may therefore be apparent that the MIMO receiver may, when necessary to update its channel estimates, transmit an RTS frame to the MIMO transmitter and use the response CTS frame as input to the channel estimation algorithm. It may be further apparent that, as the number of symbols in the CTS frame may be substantially more than the number of symbols in the training sequences in the preamble, the quality of channel estimation obtained thereby may be significantly improved.

Figure 10:
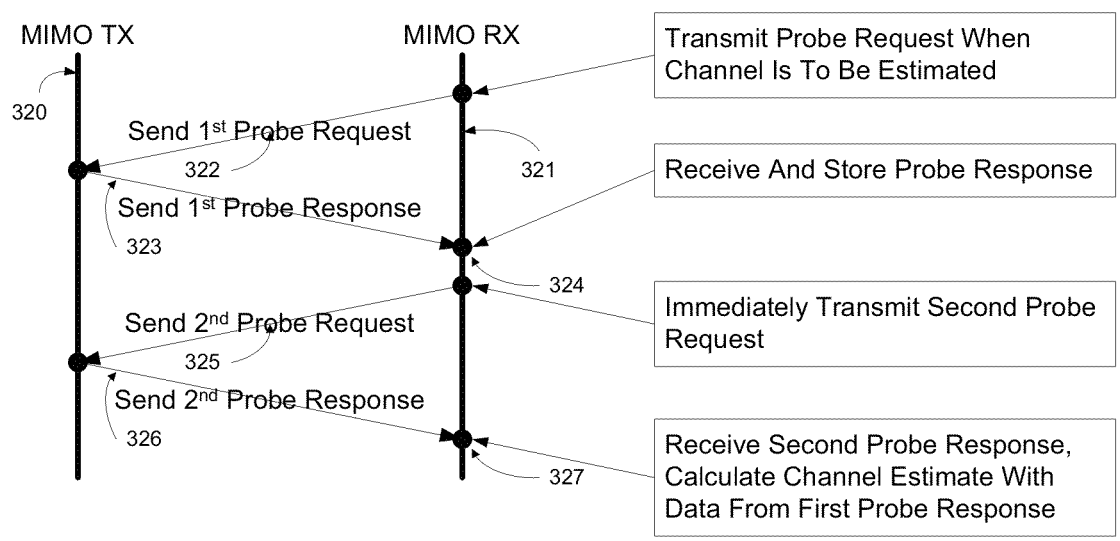
FIG. 10 depicts the steps of an exemplary probe request/response exchange wherein known probe responses are used as the known data for performing channel estimation calculations.

FIG. 10 depicts another example of a triggered frame exchange that may be used to facilitate channel estimation, wherein the frame being received is constrained by the receiver to contain known data. In this case, the frame exchange used may be a probe request/probe response exchange, for example within the IEEE 802.11 protocol. The probe request/probe response exchange may be used by a receiver to request certain configuration and capabilities information from an IEEE 802.11 transmitter, for example an IEEE 802.11 Access Point (AP). As the configuration and capabilities may be fixed by the information requested in the probe request, the probe response may contain the same information every time it is transmitted. Hence, after at least one probe response has been received, subsequent probe responses may be assumed to be containing almost exactly the same data and therefore may be predicted.

As before, line 320 may represent the steps followed by a MIMO transmitter, and line 321 may represent the steps followed by a MIMO receiver. These steps may comprise: at step 322, transmitting a first probe request from the MIMO receiver to the MIMO transmitter; at step 323, responding with a first probe response from the MIMO transmitter to the MIMO receiver; at step 324, receiving the probe response, validating its contents (e.g., by verifying the Frame Check Sequence or FCS) and storing the data; at step 325, transmitting a second probe request from the MIMO receiver to the MIMO transmitter; at step 326, responding with a second probe response from the MIMO transmitter to the MIMO receiver; at step 327, receiving the probe response and calculating a channel estimate by using the stored data from the first probe response. As the probe responses may be nearly identical, the originally transmitted data constituting the second probe response may be known in advance, and the second probe response may be utilized in a similar manner to the training sequences in the preamble.

Figure 11:
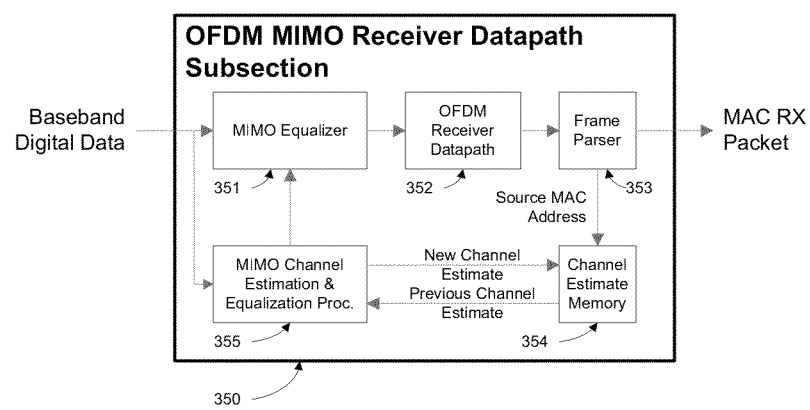
FIG. 11 depicts an exemplary aspect of a channel estimation memory for storing and retrieving channel estimates.

With reference to FIG. 11, an aspect of an embodiment is depicted wherein the channel estimates obtained from one or more previous frames received from a source may be stored and then may be used for receiving subsequent frames from the same source. The diagram illustrates a portion 350 of a OFDM MIMO receiver datapath, containing MIMO channel equalizer 351 for receiving and equalizing baseband digital data; OFDM receiver datapath for demodulating and processing OFDM symbols and subcarriers; frame parser 353 for delineating MAC frames within the demodulated data, and for extracting source MAC addresses within these frames; channel estimate memory 354 that may store new channel estimates sent to it by channel estimation and equalization processor 355, and may output a previous channel estimate selected using the source MAC address in a received frame; and MIMO channel estimation and equalization processor 355 that may accept baseband data and previous channel estimates, and may output channel equalization parameters to MIMO equalizer 351 and channel estimates to channel estimator 354.

During operation, MIMO equalizer 351, OFDM receiver datapath 352 and frame parser 353 may receive and process frame data and may extract the source MAC addresses from the frames. The source MAC addresses may uniquely distinguish the different transmitters that may be transmitting data to the MIMO receiver, for instance in an MU-MIMO situation. MIMO channel estimation and equalization processor 355 may utilize training sequences and/or data symbols to generate channel estimates and equalization matrices. After receiving each MAC frame, MIMO channel estimation and equalization processor 355 may pass the newly derived channel estimate to channel estimate memory 354, which may store it indexed by the source MAC address of the corresponding frame.

When a new MAC frame is subsequently received from the same source (i.e., one that may contain the same source MAC address), frame parser 353 may pass this MAC address to channel estimate memory 354, which may in turn retrieve the previous channel estimate and pass it to MIMO channel estimation and equalization processor 355. MIMO channel estimation and equalization processor 355 may then combine this saved channel estimate with a newly calculated channel estimate from the training sequences of the new frame to derive a more accurate channel estimate. Such combination of previous and new channel estimates may be performed in a number of ways; for example, a weighted average of the channel estimates may be calculated and used to derive the equalization matrices.

Storing one or more previous channel estimates in this manner and subsequently using these previous channel estimates to refine a newly calculated channel estimate may lead to improved accuracy of channel estimation. It may further be advantageous to re-use previously calculated channel estimates when dealing with Multi-User MIMO (MU-MIMO), as the BER for received MU-MIMO frames may be significantly improved if an initial set of equalization matrices are available that are reasonably close to the actual matrices. As MU-MIMO may perform successive cancellation calculations in order to separate each individual transmit stream at the receiver, a more accurate starting channel estimate derived from previous transmissions may greatly improve the quality of successive cancellation by reducing the amount of interference that may have to be cancelled out at each step.

Figure 12:
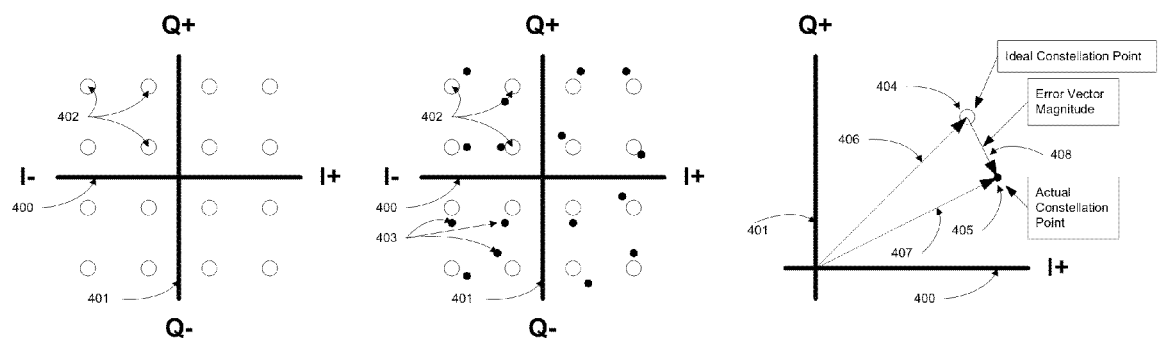
FIG. 12 shows one possible method of computing the error vector magnitude (EVM) of a received signal.

Turning now to FIG. 12, the principles for calculating Error Vector Magnitude (EVM) for a complex modulation format such as Quadrature Amplitude Modulation (QAM) may be illustrated. QAM may be represented as a set of complex-valued constellation points represented as small circles 402 distributed about an in-phase (I) axis 400 and a quadrature (Q) axis 401. (In general the I and Q axes may represent the real and imaginary components of a complex-valued signal, respectively.) Circles 402 may represent the "ideal" values of the constellation points as generated by a wireless transmitter.

As depicted in the center of FIG. 12, however, the actual received constellation points 403 may become affected by noise and distortion after passing through the RF channel and signal processing functions and may deviate from the "ideal" values 402. The magnitude of this deviation is the EVM, which may be calculated as the average Euclidean distance from the actual constellation points 403 to their corresponding "ideal" values 402. This is depicted for a single constellation point on the right side of FIG. 12; the "ideal" constellation point is represented in the in-phase and quadrature dimensions as circle 404, while the actual constellation point is the dot 405. Vector 406 represents the value of "ideal" constellation point 404 in the Cartesian plane, while vector 405 represents the value of the actual constellation point 405. The EVM for constellation point 405 is calculated as the absolute magnitude of error vector 408 connecting circle 404 and dot 405, and is independent of the direction of the error vector 408. Further, the EVM may be normalized by dividing it by the absolute power of the symbol. The EVM for the whole received symbol may be calculated as the average of the normalized EVM values for all of the constellation points in that symbol.

In one possible embodiment, the EVM may be used as an accurate estimate of the quality of the received signal as it represents the deviation of the actual received signal from the originally transmitted signal. In general, it may be observed that noise and distortion in any portion of the chain from the input of the wireless transmitter to the output of the wireless receiver, including the RF channel, may cause the EVM to increase. The use of the EVM as a metric to be minimized may be particularly useful in MIMO systems, due to the significant influence of channel conditions and the quality of channel estimation on the bit error ratio (BER) of the recovered digital data. Any increase in the EVM may in turn likely result in an increase in the BER. Therefore, it may be preferable to condition the channel estimation algorithm to minimize the resulting EVM. As the EVM of a received MIMO signal may be calculated using a partial transmitter datapath, it may be further advantageous to use the EVM to determine whether an updated channel estimate is improving the efficacy of reception in the embodiment depicted in FIG. 7 and the procedure depicted in FIG. 8. A new channel estimate and equalization matrix may be preferred over an existing one if the EVM as calculated using the new channel estimate is lower than that calculated using the former.

In accordance with another aspect, the Viterbi decoder in the receiver may be utilized for updating channel estimates. With reference to previously described FIG. 7, Viterbi decoder 180 may accept a stream of coded bits, which may be encoded using Binary Convolutional Coding (BCC) at the transmitter, and may perform error detection and correction using redundant information introduced as part of the coding process. After removing the redundant information, the corrected data may be output. This may lead to a substantial improvement in the BER. The Viterbi decoder may also concurrently indicate the number of bits that were corrected in any given block of data, which may in turn be indicative of receive signal quality; that is, if more bits had to be corrected, then the quality of the received signal after equalization may be lower. This may be used to determine whether to replace an existing channel estimate and equalization matrix with a newly calculated one. If the newly calculated channel estimate and equalization matrix results in a lower number of bits being corrected by the Viterbi decoder over a set of symbols, this new estimate may replace the current estimate; otherwise, the current estimate may be retained unchanged for the next set of symbols.

Figure 13:
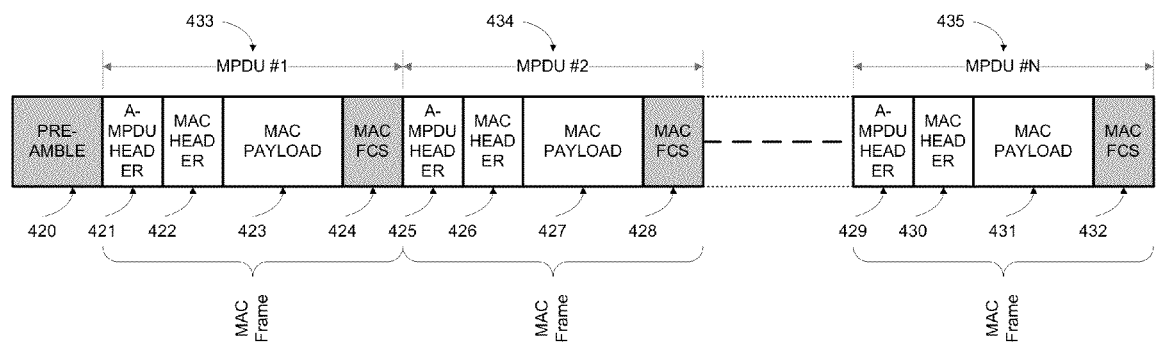
FIG. 13 depicts an illustrative example of an aggregated MAC protocol data unit (A-MPDU) combining multiple frames with individual Frame Check Sequence (FCS) fields and a single preamble.

As already noted, wireless protocols such as IEEE 802.11 may support aggregated Medium Access Control (MAC) Protocol Data Unit (PDU) frames (i.e., A-MPDUs) that concatenate multiple MAC frames together with a single preamble to generate aggregate frames that may be very long. FIG. 13 may represent a simplified view of one such A-MPDU, comprising: preamble 420; A-MPDU headers 421, 425, 429; MAC headers 422, 426, 430; MAC payloads 423, 427, 431; and MAC Frame Check Sequence (FCS) fields 424, 428 and 432 containing cyclic redundancy check words. It is understood that the number of MAC frames in a single A-MPDU may range from 1 to any number (with a maximum of 64 in IEEE 802.11). In FIG. 13, this is represented by MAC PDUs (MPDUs) 433, 434 and 435 respectively.

A-MPDUs may offer very efficient data transfer, but due to the use of only a single preamble (containing a single training sequence), the channel estimate may degrade substantially towards the end of an A-MPDU. This may cause bit errors to occur while receiving MPDUs towards the end of the A-MPDU (such as MPDU #N 435 in FIG. 13), even though earlier MPDUs may have been decoded without errors. It may therefore be preferable to update the channel estimate periodically through the course of receiving an A-MPDU. However, it may also be advantageous to only selectively update the channel estimate when the received data is known to be free of bit errors. Calculating a channel estimate by reconstructing the transmit symbol stream from received data containing bit errors may cause large errors to be injected into the channel estimate, and may thereby significantly degrade the quality of reception.

Figure 14:
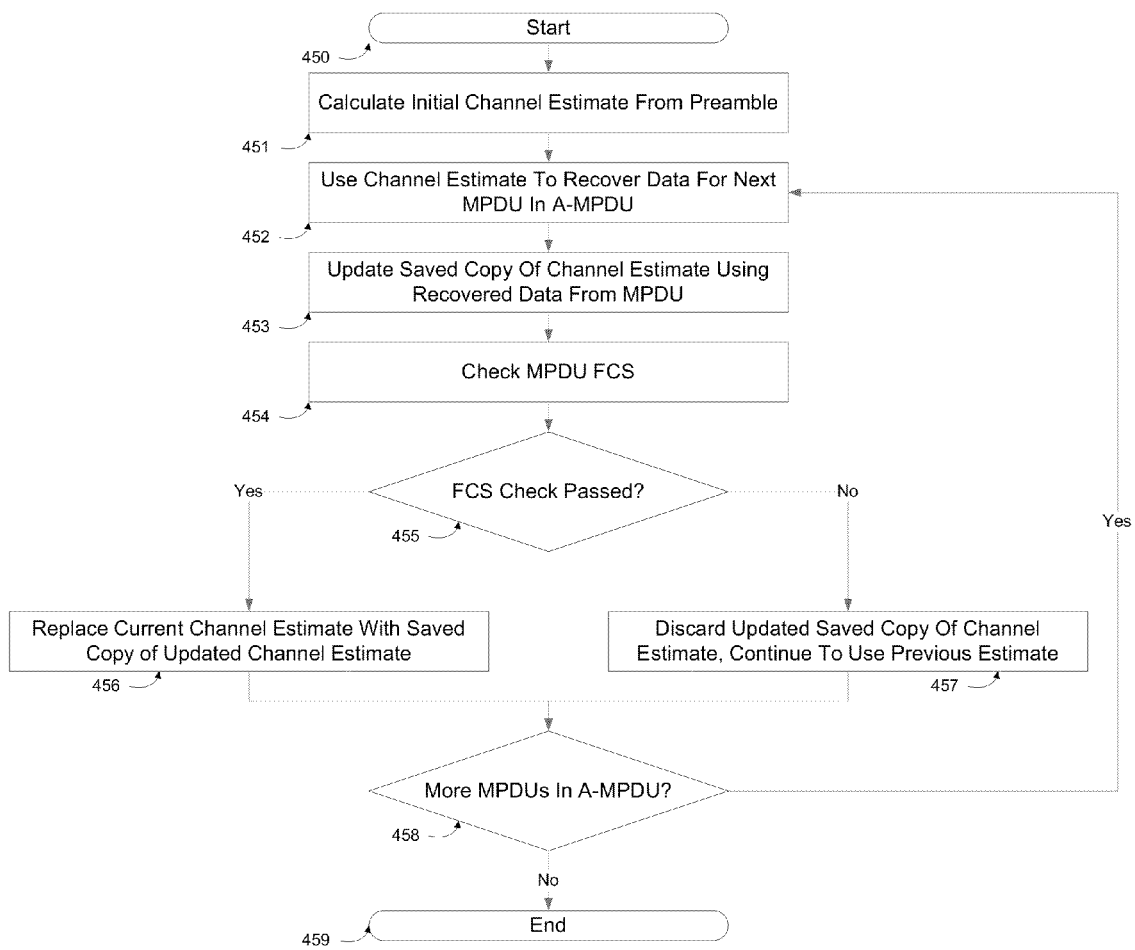
FIG. 14 provides an illustrative flow chart to calculate and update channel estimates when receiving A-MPDUs.

FIG. 14 illustrates an exemplary procedure for selectively calculating and updating a channel estimate according to another aspect of an embodiment. The procedure may comprise the steps of:
a) At step 450, starting the procedure when an A-MPDU frame is received;
b) At step 451, receiving the frame preamble, calculating an initial channel estimate and equalization matrix from the training sequences in the preamble, and setting this as the current channel estimate;
c) At step 452, using the current channel estimate and equalization matrix to recover data for the next MPDU (i.e., MAC frame) within the A-MPDU;
d) At step 453, updating a saved copy of the current channel estimate and equalization matrix using the recovered data from the MPDU to regenerate the original transmitted data, for instance using the procedure described in FIG. 8;
e) At step 454, checking the MPDU FCS at the end of the MPDU;
f) At step 455, determining if the FCS check has passed (indicating no bit errors during reception and a fully valid regenerated transmitted data) or failed (indicating that the regenerated transmitted data stream was invalid);
g) At step 456, if the FCS check passed, accepting the saved and updated copies of the channel estimate and equalization matrix as valid, and replacing the current channel estimate and equalization matrix with the updated versions;

h) At step 457, if the FCS check failed, discarding the saved and updated copies of the channel estimate and equalization matrix and continuing to use the previous (i.e., last known-good) channel estimate and equalization matrix;

i) At step 458, determining if more MPDUs exist in the A-MPDU, an returning to step 452 to process them if so; and j) At step 459, ending the procedure when the A-MPDU has come to an end.

The procedure illustrated in FIG. 14 may only replace the channel estimate and equalization matrix used for decoding data if the received bitstream is known to be good, and therefore the regenerated transmit data may exactly match the original transmit data. This may avoid the issue of corrupting the channel estimate and equalization matrix by attempting to update them from corrupted received frame data. It is further apparent that the procedure illustrated in FIG. 14 may be used for a sequence of single frames rather than an A-MPDU comprising several concatenated frames, for example when the calculated channel estimate and equalization matrices are stored for use over time.

It will be apparent to those of ordinary skill in the art that the embodiments and aspects described herein may be applicable to a number of wireless communications protocols such as the IEEE 802.11 and Long Term Evolution (LTE) protocols. In the case of IEEE 802.11, the STF/LTF training sequences may provide initial channel estimates, and the frame data symbols may provide updated and improved channel estimates. In the case of LTE, the primary and secondary synchronization sequences (PSS and SSS, respectively) may provide initial channel estimates, the reference symbols may provide similar functions as 802.11 pilot symbols, and the data symbols may provide updated and improved channel estimates.

It will be appreciated that, in accordance with embodiments described herein, the accuracy of channel estimates and corresponding equalization matrices may be greatly improved by including the received data symbols in the channel estimates without being impacted by bit errors in the decoded data bitstreams. Further, certain aspects described herein may reduce the impact of channel and RF datapath noise upon the equalization process. Yet further, certain embodiments described herein may enable the re-use of portions of the transmit datapath to support the use of received data symbols in the channel estimation process. Advantageously, this may significantly reduce the bit error ratio of received data streams, and also may permit this to be achieved without significant increases in cost or complexity.

It will also be appreciated that, in accordance with aspects of embodiments described herein, the accuracy of channel estimates and corresponding equalization matrices may be maintained over long received frames, for example frame aggregates such as IEEE 802.11 A-MPDUs. Advantageously, this may permit increased efficiency of communication by increasing the frame size without correspondingly increasing the overhead dedicated to channel estimation and equalization training sequences, or suffering an increased bit error ratio.

It will further be appreciated that, in accordance with aspects of embodiments described herein, channel estimation may be performed at a wireless receiver by causing the transmission of frames whose contents may be substantially known in advance and which may therefore serve similar purposes to extended training sequences. Advantageously, this may enable the simplified tracking of channel state and the increased accuracy of initial channel estimates and corresponding equalization matrices used for the reception of succeeding data frames.

It will yet further be appreciated that, in accordance with certain teachings herein, these aspects and embodiments may be applicable to a number of wireless communication technologies, such as OFDM, MIMO, and MU-MIMO. As such, they may provide methods of achieving substantially improved channel estimation and equalization without significant additional complexity. Advantageously, this may permit reduced cost and complexity of implementing technologies such as MU-MIMO that may be constrained by the accuracy of channel estimation.

According to another aspect of the subject matter described herein, a system for generating a channel equalization matrix for digital communications over a wireless channel is provided. The system includes a receive processor for receiving information over said wireless channel and converting it to a first stream of modulated symbols. The system further includes a buffer for storing said first stream of modulated symbols as a buffered stream of modulated symbols. The system further includes a demodulation function for converting said first stream of modulated symbols to a digital bitstream. The system further includes a modulation function for converting said digital bitstream back to a second stream of modulated symbols. The system further includes a channel equalization processor operatively coupled to said buffer and said modulation function, where said channel equalization processor is operative to calculate at least one wireless channel equalization matrix utilizing said buffered stream of modulated symbols and said second stream of modulated symbols.

According to another aspect of the subject matter described herein, the system may further include a processor for extracting at least one predetermined training sequence from said information received over said wireless channel, wherein said channel equalization processor calculates a second at least one wireless channel equalization matrix from said predetermined training sequence.

According to another aspect of the subject matter described herein, the system may further include an error-correction function for detecting and correcting errors in said digital bitstream prior to conversion back to said second stream of modulated symbols.

According to another aspect of the subject matter described herein, the system may further include a transmit datapath for transmitting modulated symbols, converted from a second digital bitstream, over said wireless channel.

According to another aspect of the subject matter described herein, said modulation function comprises a portion of said transmit datapath that is normally inactive during reception.

According to another aspect of the subject matter described herein, said receive processor and said demodulation function are adapted to perform Multiple Input Multiple Output (MIMO) reception.

According to another aspect of the subject matter described herein, said channel equalization processor is adapted to generate the at least one channel equalization matrix for a MIMO wireless channel.

According to another aspect, the subject matter described herein includes a method of generating a channel equalization matrix for digital communications over a wireless channel. The method includes receiving information over said wireless channel and converting it to a first stream of modulated symbols using at least one first channel equalization matrix. The method further includes storing said first stream of modulated symbols in a buffer. The method further includes demodulating and decoding said first stream of modulated symbols to obtain a digital bitstream. The method further includes modulating and converting said digital bitstream to generate a second stream of modulated symbols. The method further includes processing said first stream of modulated symbols and said second stream of modulated symbols to calculate at least one second channel equalization matrix. The method further includes calculating at least one third channel equalization matrix as a function of said at least one first equalization matrix and said at least one second equalization matrix. The method further includes calculating a replacement predicate, wherein said at least one third equalization matrix replaces said at least one first equalization matrix according to said replacement predicate.

According to another aspect, of the subject matter described herein, the at least one third equalization matrix is calculated as a linear combination of said at least one first equalization matrix and said at least one second equalization matrix.

According to another aspect of the subject matter described herein, the linear combination is an exponential weighted moving average.

According to another aspect of the subject matter described herein, the method for generating the channel equalization matrix includes correcting bit errors in said digital bitstream before modulating and converting to obtain said second stream of modulated symbols.

According to another aspect of the subject matter described herein, the calculation of said replacement predicate further includes calculating a matrix condition number.

According to another aspect of the subject matter described herein, the matrix condition number is calculated as an approximation using Q-R decomposition.

According to another aspect of the subject matter described herein, the calculation of said replacement predicate further includes the number of corrected bit errors.

According to another aspect of the subject matter described herein, the calculation of said replacement predicate further includes calculating an Error Vector Magnitude (EVM).

According to another aspect of the subject matter described herein, the calculation of said replacement predicate further includes calculating a Frame Check Sequence (FCS) over a portion of said digital bitstream.

According to another aspect of the subject matter described herein, said wireless channel is a MIMO wireless channel, and said received information is MIMO information.

According to another aspect of the subject matter described herein, said wireless channel is a Multi-User MIMO (MU-MIMO) wireless channel, and said received information is MU-MIMO information.

According to another aspect of the subject matter described herein includes a method of generating a channel equalization matrix for digital communications over a wireless channel between a wireless data transmitter and a wireless data receiver. The method includes transmitting a first frame from said wireless data receiver to said wireless data transmitter. The method further includes processing said first frame in said wireless data transmitter. The method further includes transmitting a second frame from said wireless data transmitter to said wireless data receiver responsive to said first frame. The method further includes calculating a channel equalization matrix using the information in said second frame. The information in said second frame is conditioned by said first frame.

According to another aspect of the subject matter described herein, the first frame is a Request To Send (RTS) frame, and said second frame is a Clear To Send (CTS) frame, respectively.

According to another aspect of the subject matter described herein, a system for calculating a channel equalization matrix for digital communications over a wireless channel. The system includes a receive datapath for receiving and processing a plurality of frames over said wireless channel to generate a digital bitstream. The system further includes a frame parser for processing said digital bitstream to extract an identifier corresponding to the transmitter of said plurality of frames. The system further includes a channel equalization processor coupled to said receive datapath and operative to calculate at least one equalization matrix. The system further includes a storage unit coupled to said channel equalization processor and responsive to store and retrieve said at least one equalization matrix calculated by said channel equalization processor indexed by said identifier extracted by said frame parser, wherein said storage unit provides said channel equalization processor with said at least one equalization matrix when said identifier is detected in said digital bitstream.

According to another aspect of the subject matter described herein, said identifier is a Medium Access Control (MAC) address. According to another aspect of the subject matter described herein, said storage unit is further adapted to store a plurality of said at least one equalization matrices indexed by a corresponding plurality of said identifiers, and wherein said storage unit is further responsive to retrieve a different plurality of said at least one equalization matrices when provided with a corresponding different plurality of said identifiers by said frame parser.

According to another aspect of the subject matter described herein, the system is adapted to receive and process MU-MIMO frames.

According to another aspect of the subject matter described herein, a method of generating a channel equalization matrix for digital communications over a wireless channel between a wireless data transmitter and a wireless data receiver is provided. The method includes transmitting a first frame from said wireless data receiver to said wireless data transmitter. The method further includes processing said first frame in said wireless data transmitter. The method further includes transmitting a second frame from said wireless data transmitter to said wireless data receiver responsive to said first frame. The method further includes transmitting a third frame from said wireless data receiver to said wireless data transmitter, wherein information in said third frame is conditioned by information in said first frame. The method further includes processing said third frame in said wireless data transmitter. The method further includes transmitting a fourth frame from said wireless data transmitter to said wireless data receiver responsive to said third frame. The method further includes calculating a channel equalization matrix. Calculation of said channel equalization matrix uses information within said second frame and said fourth frame.

According to an aspect of the subject matter described herein, said first frame and said second frame are probe request frames, and said second frame and said fourth frame are probe responses, respectively.

According to another aspect of the subject matter described herein, a method of updating a channel equalization matrix for digital communications over a wireless channel between a wireless data transmitter and a wireless data receive is provided. The method includes transmitting a first frame from said wireless data transmitter to said wireless data receiver. The method further includes processing said first frame within said wireless data receiver. The method further includes calculating at least one first channel equalization matrix from information contained within said first frame. The method further includes transmitting a second frame from said wireless data transmitter to said wireless data receiver. The method further includes processing said second frame within said wireless data receiver. The method further includes calculating at least one second channel equalization matrix from information contained within said second frame. The method further includes updating said at least one first equalization matrix with said at least one second equalization matrix. Said updating is performed according to a predetermined condition.

According to one aspect of the subject matter described herein, said predetermined condition is that no error was detected in said second frame during processing.

According to another aspect of the subject matter described herein, said error was detected using an FCS check performed over a portion of the digital bitstream of said second frame.

According to another aspect of the subject matter described herein, said first frame and said second frame are part of a burst of concatenated frames.

According to another aspect of the subject matter described herein, said burst of concatenated frames is an Aggregated-MAC Protocol Data Unit (A-MPDU).

According to another aspect of the subject matter described herein, a method of calculating a channel equalization matrix for digital communications over a wireless channel between a wireless data transmitter and a wireless data receiver is provided. The method includes transmitting at least one frame from said wireless data transmitter to said wireless data receiver. The method further includes processing said at least one frame within said wireless data receiver. The method further includes calculating at least one channel equalization matrix from information contained within said at least one frame. The method further includes filtering said at least one channel equalization matrix, where said filtering is conducted to minimize the noise content of said at least one channel equalization matrix.

According to another aspect of the subject matter described herein, said filtering includes setting at least one entry of said at least one channel equalization matrix to zero.

According to another aspect of the subject matter described herein, said at least one entry is set to zero if the absolute magnitude of said at least one entry is below a predetermined threshold.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A system for generating channel estimates or a channel equalization matrix for digital communications over a wireless channel, comprising:
   a receive processor for receiving information carried via radio frequency (RF) signals over said wireless channel and converting the information to a first stream of modulated symbols;
   a buffer for storing said first stream of modulated symbols as a buffered stream of modulated symbols;
   an equalizer coupled to said receive processor for removing effects of said wireless channel on said RF signals and generating a version of originally transmitted modulated symbols;
   a demodulation function for converting said version of originally transmitted modulated symbols to a digital bitstream;
   a modulation function coupled to said demodulation function for recreating a version of originally transmitted modulated symbols from said digital bitstream; and
   a channel estimation processor operatively coupled to said buffer and said modulation function, for obtaining delayed copies of said first stream of modulated symbols from said buffer upstream from said equalizer, for obtaining said recreated version of the originally transmitted modulated symbols, for performing a channel estimation calculation using said delayed copies and said recreated version to produce equalization parameters, and for feeding the equalization parameters to said equalizer for improving channel estimation performed by said equalizer.

2. The system of claim 1, further including a processor for extracting at least one predetermined training sequence from said information received over said wireless channel, wherein said channel estimation processor calculates at least one of: a second wireless channel estimate and a second channel equalization matrix from said predetermined training sequence.

3. The system of claim 2, wherein said channel estimation processor calculates a third channel equalization matrix from said second wireless channel estimate.

4. The system of claim 1, wherein said channel estimation processor calculates said first channel equalization matrix from said first wireless channel estimate.

5. The system of claim 4, wherein said channel estimation processor is adapted to calculate said first channel equalization matrix for a Multiple Input Multiple Output (MIMO) wireless channel.

6. The system of claim 1, further including an error-correction function for detecting and correcting errors in said digital bitstream prior to conversion back to said second stream of modulated symbols.

7. The system of claim 6, wherein said error-correction function is a Viterbi decoder.

8. The system of claim 1, wherein said system includes a transmit datapath for transmitting modulated symbols, converted from a second digital bitstream, over said wireless channel.

9. The system of claim 8, wherein said modulation function comprises a portion of said transmit datapath that is normally inactive during reception.

10. The system of claim 1, wherein said receive processor and said demodulation function are adapted to perform Multiple Input Multiple Output (MIMO) reception.

11. The system of claim 1, wherein said channel estimation processor is adapted to generate said first channel estimate for a Multiple Input Multiple Output (MIMO) wireless channel.

12. A method for generating channel estimates or a channel equalization matrix for digital communications over a wireless channel, the method comprising:
   receiving, by a receive processor, information carried via radio frequency (RF) signals over said wireless channel and converting the information to a first stream of modulated symbols;
   storing, in a buffer, said first stream of modulated symbols as a buffered stream of modulated symbols;

removing, by an equalizer, effects of said wireless channel on said RF signals and generating a version of originally transmitted modulated symbols;

converting, by a demodulation function, said version of originally transmitted modulated symbols to a digital bitstream;

recreating, by a modulation function, a version of originally transmitted modulated symbols from said digital bitstream; and using a channel estimation processor, obtaining delayed copies of said first stream of modulated symbols from said buffer upstream from said equalizer, obtaining said recreated version of the originally transmitted modulated symbols, performing a channel estimation calculation using said delayed copies and said recreated version to produce equalization parameters, and feeding the equalization parameters to said equalizer for improving channel estimation performed by said equalizer.

13. The method of claim 12, comprising extracting at least one predetermined training sequence from said information received over said wireless channel and calculating at least one of: a second wireless channel estimate and a second channel equalization matrix from said predetermined training sequence.

14. The method of claim 13, wherein said channel estimation processor calculates a third channel equalization matrix from said second wireless channel estimate.

15. The method of claim 12, wherein said channel estimation processor calculates said first channel equalization matrix from said first wireless channel estimate.

16. The method of claim 15, wherein calculating said first channel equalization matrix includes calculating said first channel equalization matrix for a Multiple Input Multiple Output (MIMO) wireless channel.

17. The method of claim 12, further including an error-correction function for detecting and correcting errors in said digital bitstream prior to conversion back to said second stream of modulated symbols.

18. The method of claim 17, wherein said error-correction function is a Viterbi decoder.

19. The method of claim 12, comprising transmitting modulated symbols, converted from a second digital bitstream, over said wireless channel.

20. The method of claim 12, wherein receiving said information comprises receiving a Multiple Input Multiple Output (MIMO) signal.

21. The method of claim 12, wherein generating said first channel estimate includes generating said first channel estimate for a Multiple Input Multiple Output (MIMO) wireless channel.

22. A non-transitory computer readable medium having stored therein executable instructions that when executed by the processor of a computer control the computer to perform steps comprising:

receiving, by a receive processor, information carried via radio frequency (RF) signals over said wireless channel and converting the information to a first stream of modulated symbols;

storing, in a buffer, said first stream of modulated symbols as a buffered stream of modulated symbols;

removing, by an equalizer, effects of said wireless channel on said RF signals and generating a version of originally transmitted modulated symbols;

converting, by a demodulation function, said version of originally transmitted modulated symbols to a digital bitstream;

recreating, by a modulation function, a version of originally transmitted modulated symbols from said digital bitstream; and using a channel estimation processor, obtaining delayed copies of said first stream of modulated symbols from said buffer upstream from said equalizer, obtaining said recreated version of the originally transmitted modulated symbols, performing a channel estimation calculation using said delayed copies and said recreated version to produce equalization parameters, and feeding the equalization parameters to said equalizer for improving channel estimation performed by said equalizer.

* * * * *